United States Patent [19]
Rampel et al.

[11] 4,056,660
[45] Nov. 1, 1977

[54] RECHARGEABLE CELL WITH OXYGEN SENSING ELECTRODE

[75] Inventors: Guy G. Rampel, Gainesville; Jon R. Young, High Springs, both of Fla.

[73] Assignee: General Electric Company, Columbus, Ohio

[21] Appl. No.: 778,898

[22] Filed: Mar. 18, 1977

Related U.S. Application Data

[63] Continuation of Ser. No. 709,355, July 28, 1976, abandoned.

[51] Int. Cl.² .......................................... H01M 10/34
[52] U.S. Cl. ...................................... 429/59; 429/206
[58] Field of Search .................................. 429/57–60, 429/206, 212, 222

[56] References Cited

U.S. PATENT DOCUMENTS

| | | | |
|---|---|---|---|
| 3,350,225 | 10/1967 | Seiger | 429/59 |
| 3,410,725 | 11/1968 | Harivel | 429/59 |
| 3,554,804 | 1/1971 | Carson, Jr. | 429/58 |
| 3,554,805 | 1/1971 | Weinstock | 429/58 |
| 3,630,781 | 12/1971 | Rampel | 427/126 |
| 3,769,088 | 10/1973 | Seiger et al. | 429/58 |
| 3,877,985 | 4/1975 | Rampel | 429/59 |

Primary Examiner—Charles F. LeFevour
Attorney, Agent, or Firm—Donald J. Voss; Dennis A. Dearing; Frank L. Neuhauser

[57] ABSTRACT

A rechargeable nickel-cadmium cell including a plurality of alternately arranged positive and negative electrodes. An oxygen sensing electrode is provided between one of the positive and one of the negative electrodes and connected to the negative terminal of the cell through an external resistor. The sensing electrode includes a suitable substrate on which cadmium is caused to be deposited, the cadmium, in the preferred form of the invention, being deposited in an amount approximately 20% of that employed in making the negative electrodes of the cell. Thereafter, the electrode is treated with silver and also, in one form of the invention, with a hydrophobic fluorocarbon polymer, such as polytetrafluoroethylene, these materials being dispersed in intimate contact with the relatively porous cadmium deposit.

11 Claims, 8 Drawing Figures

RECHARGEABLE CELL WITH OXYGEN SENSING ELECTRODE

This is a continuation, of application serial No. 709,355 filed July 28, 1976, now abandoned.

BACKGROUND OF THE INVENTION

1. Field of the Invention

This invention relates to rechargeable cells and more particularly to rechargeable cells of the type which include an oxygen sensing electrode.

2. Description of Prior Art

The prior art includes a number of examples of sealed rechargeable nickel-cadmium cells which include sensing electrodes for sensing the accumulation of oxygen within the cell during charging and even for reducing the amount of charge when the oxygen pressure is indicated to have reached a predetermined level. An example of such a sensing electrode is shown in U.S. Pat. No. 3,554,804, Carson, Jr., which is assigned to the assignee of the present invention.

The prior art discloses the use of silver on the negative electrode of a rechargeable nickel-cadmium cell for enhancing the recombination of oxygen and thereby reducing the pressure build-up of oxygen during charging. An example of this prior art is U.S. Pat. No. 3,877,985, Rampel, also assigned to the assignee of the present invention. In the particular structure disclosed in that patent the negative electrode comprises a substrate with nickel particles bonded thereon, an active material, namely cadmium, impregnated in the pores of the nickel and a small deposit of silver particles dispersed in intimate contact with the cadmium.

Some prior art oxygen sensing electrodes have been formed on a substrate of nickel or nickel-plated steel coated with sintered nickel powder. A sheet of hydrophobic fluorocarbon polymer, particularly polytetrafluoroethylene, has been applied to one side of the electrode as disclosed, for example, in the aforementioned U.S. Pat. No. 3,554,804, Carson, Jr. This construction allowed oxygen forming in the cell to diffuse through the polytetrafluoroethylene film, which is previous to oxygen, to produce a voltage representative of the oxygen forming in the cell. This voltage, appearing across an external resistor between the sensing electrode and the negative electrode, could be employed simply to indicate the oxygen pressure in the cell so that action could be taken to discontinue or reduce the charging rate when the oxygen pressure is indicated to have reached a predetermined level. Alternatively, the sensed voltage could be used, for example, as shown in the aformentioned U.S. Pat. No. 3,554,804, to actuate a control for automatically reducing the charging current supplied from the charging source. However, while a polytetrafluoroethylene layer in film form, as in the Carson, Jr. sensing electrode, is pervious to oxygen, and hence allows the oxygen to pass to the electrode, it is impervious to ionic current flow. Therefore, prior art sensing electrodes of this type could not be used between negative and positive electrodes without a sacrifice in cell performance.

Rechargeable electrodes have been disclosed in the prior art (see U.S. Pat. No. 3,630,781, Rampel), which utilized polytetrafluoroethylene in dispersion form. In this form the polytetrafluoroethylene is pervious to ionic current as well as oxygen. No reference is made in this patent to the use of polytetrafluoroethylene in this form on an oxygen sensing electrode.

Silver has been used on a sensing electrode in the prior art, in fuel cells, for example since it is known that silver is more catalytically active to oxygen than, for example, nickel. However, attempts to use it on a sensing electrode in nickel-cadmium cells employing an alkaline electrolyte, such as potassium hydroxide, have not been successful because of the solubility of silver oxide (formed by combination of the silver with the oxygen generated during charging) in the alkaline electrolyte and the consequent migration of the silver oxide throughout the cell and consequent loss of silver from the sensing electrode and also damage to the cell.

In accordance with the present invention these limitations of the prior art are overcome and an oxygen sensing electrode is provided which develops a signal of greater magnitude across a lower load resistance than that of prior art sensing electrodes for a given oxygen pressure developed in the cell. The sensing electrode of this invention is pervious to oxygen, so that oxygen developed at the positive electrode passes readily to the sensing electrode for developing a signal voltage indicative of the oxygen pressure, and is also permeable to ionic current so that the sensing electrode may be placed within the cell between positive and negative electrodes without any adverse effect on the performance of the cell. Moreover, because of the employment of silver which is more catalytically active to oxygen, a greater external signal voltage is developed between the sensing electrode and the negative electrode even with a substantially smaller external resistor. Finally, despite the utilization of silver in an alkaline electrolyte, the construction of the sensing electrode of this invention is such that no significant migration of silver oxide occurs.

It is, therefore, an object of this invention to provide an improved rechargeable cell including an oxygen sensing electrode which provides a greater signal voltage across a lower load resistance for a given oxygen pressure in the cell.

It is another object of this invention to provide a sensing electrode for such a cell which may be employed between positive and negative electrodes thereof.

It is a further object of this invention to provide a sensing electrode, using silver as a component thereof, which avoids migration of silver oxide through the cell.

SUMMARY OF THE INVENTION

In carrying out this invention, in one form thereof, there is provided a rechargeable nickel-cadmium cell including a plurality of alternately arranged positive and negative electrodes. An oxygen sensing electrode is provided between one of the positive and one of the negative electrodes and connected to the negative terminal of the cell through an external resistor. The sensing electrode includes a suitable substrate upon which a sintered nickel coating is formed. Thereafter, cadmium is caused to be deposited, the cadmium, in the preferred form of the invention, being deposited in an amount approximately 20% of that employed in making the negative electrodes of the cell. Thereafter, the electrode is treated with silver and also, in one form of the invention, with a hydrophobic fluorocarbon polymer, such as polytetrafluoroethylene, these materials being dispersed in intimate contact with the relatively porous cadmium deposit. When both silver and a hydrophobic fluorocarbon polymer are employed, the silver may first be caused to be dispersed in intimate contact with the cadmium and then the fluorocarbon polymer or in reverse order or both may be dispersed simultaneously from a given solution.

DESCRIPTION OF THE DRAWINGS

The invention may be better understood by reference to the accompanying drawings, in which.

DESCRIPTION OF THE PREFERRED EMBODIMENT

Figure 1:
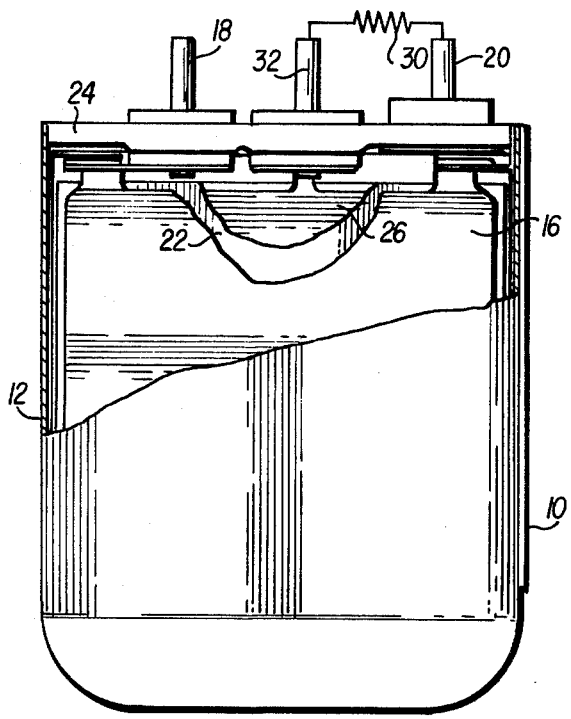
FIG. 1 is a view, partly broken away, of a rechargeable nickel-cadmium cell incorporating the oxygen sensing electrode of this invention.
Figure 2:
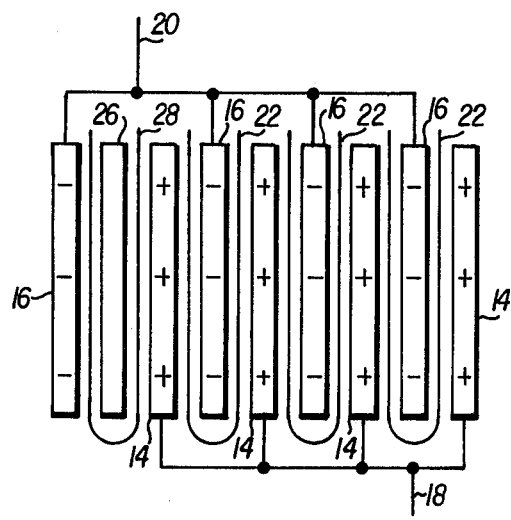
FIG. 2 is an illustration, in schematic form, of the relationship of the sensing electrode to the positive and negative electrodes, the electrodes and separators being shown substantially spaced from each other only for purposes of clarity.

Referring now to FIGS. 1 and 2 there is shown a rechargeable nickel-cadmium cell 10 which includes a casing 12. Within the casing 12 there are arranged a plurality of positive electrodes or plates 14 and a plurality of negative electrodes or plates 16. The positive and negative electrodes are interleaved in a conventional manner so that they alternate within the casing 12. The relationship is shown schematically in FIG. 2 which shows the positive and negative electrodes arranged in alternating fashion from one side of the cell to the other. It will be understood that while the electrodes and separators have been illustrated in substantially spaced relationship in FIG. 2, this is only for illustrative purposes and in the actual cell the adjacent elements are essentially in abutting relationship. The positive electrodes are connected to a common terminal 18 and the negative electrodes are correspondingly connected to a common terminal 20. In practice the positive electrodes may be formed in a comb-like structure and the negative electrodes correspondingly formed, the "teeth" forming the positive and negative electrodes being interleaved to give the alternate arrangement illustrated schematically in FIG. 2.

Separators 22 are provided between positive and negative electrodes. The separators may be in the form of bags of polypropylene, nylon or other suitable material surrounding the negative electrodes and heat sealed at the edges in a conventional manner. While in the specific structure illustrated the separators are shown surrounding negative electrodes, it will be understood that they could equally well be applied instead to the positive electrodes. Also, it will be understood that the end electrodes will be suitably separated from the casing. To complete the assembly, the terminals 18 and 20 are positioned in sealed relationship on a cover 24 and this cover is sealed in any suitable conventional manner to the wall of the casing 12.

The electrolyte employed is a alkaline electrolyte and more particularly, in the preferred embodiment, is aqueous potassium hydroxide. More specifically, the polypropylene or other material from which the separators 22 are made is impregnated with this electrolyte.

In the charging of such rechargeable nickel-cadmium cells, oxygen forms at the positive electrode. It is desirable that the ultimate pressure of the oxygen so formed should not exceed a predetermined amount in order not to have an adverse effect on the casing and the sealing thereof. Accordingly, it has been the practice with some rechargeable cells of this type to provide an oxygen sensing electrode which is responsive to the pressure of oxygen developed in the cell during charging and which provides a signal, usually a voltage between the sensing electrode and the negative terminal, to indicate the amount of oxygen pressure developing in the cell. This sensing electrode may merely provide a signal indicative of the oxygen pressure so that, when this pressure reaches a predetermined level, action may be taken to discontinue the charging or to reduce the charging rate. Alternatively, the sensing electrode may be employed to automatically discontinue the charging or reduce the charging rate.

In accordance with the present invention an oxygen sensing electrode is constructed which achieves significantly improved performance. Referring again to FIGS. 1 and 2, the oxygen sensing electrode of this invention is shown at 26 and, as best illustrated in FIG. 2, is positioned between the two end positive and negative electrodes. The sensing electrode 26 is surrounded by a separator 28 which is formed of polypropylene, nylon or other suitable material, as in the case of the earlier-described separators 22.

In accordance with the present invention, the sensing electrode is constructed in a particular manner which yields the improved results. The sensing electrode includes a substrate of nickel-plated steel upon which a sintered nickel coating is formed. Cadmium is caused to be deposited on this coated substrate. In the preferred form of the invention, the cadmium is deposited in an amount approximately 20% of that employed in making the negative electrodes of the cell, but larger or smaller amounts of cadmium may be employed if desired. Thereafter, in the preferred form of this invention, silver is dispersed in intimate contact with the cadmium and a hydrophobic fluorocarbon polymer is also dispersed within the cadmium. In the preferred form of the invention, this hydrophobic fluorocarbon polymer is polytetrafluoroethylene. The silver may be employed first and the polytetrafluoroethylene thereafter or the polytetrafluoroethylene may be first caused to be dispersed followed by silver or the two may be caused to be simultaneously dispersed if desired. The order in which these two materials are added to the electrode is not important. If desired, the polytetrafluoroethylene may be employed in film form, in which case the sensing electrode would not be placed between a positive electrode and a negative electrode but would be positioned, for example, outside the end negative electrode or along the edges of the electrodes. Moreover, improved results over those achieved with prior art sensing electrodes can be achieved using silver without the polytetrafluoroethylene, but the use of both silver and polytetrafluoroethylene further enhances the magnitude of the signal voltage obtained for a given oxygen pressure in the cell, because polytetrafluoroethylene is hydrophobic. As an anti-wetting agent, it prevents the pores of the electrode from being flooded with electrolyte.

Silver has previously been considered as a component of a sensing electrode for sensing oxygen developed in a cell, because it was known to have greater catalytic activity than nickel in converting oxygen to the hydroxyl (OH) ion. It has been so used in fuel cells, but attempts to use it on a sensing electrode in the alkaline electrolyte environment of a rechargeable nickel-cadmium cell have not been successful due to the solubility and migration of the silver oxide formed by combination of the silver with the oxygen generated during charging of the cell. By the present invention, this problem is overcome by also causing cadmium to be deposited on the sensing electrode substrate and causing the silver to be dispersed in intimate contact with the cadmium, as described above. The cadmium prevents the migration of silver by reducing the silver and locking the silver to the sensing electrode as silver and preventing the formation of silver oxide which would tend to migrate throughout the cell. Thus, the combination of elements employed in constructing the sensing electrode of this invention takes advantage of the greater catalytic activity of silver to develop a greater voltage for the same oxygen pressure than was available with prior art sensing electrodes and at the same time prevents the migration of silver oxide which would otherwise have an adverse effect on the performance of the cell.

The invention may be better understood by reference to the following example:

EXAMPLE

A thin (10–15 mils) porous sintered nickel matrix is impregnated with cadmium hydrate 3.5g/dm$^2$. The electrode is then electrically charged and discharged against a counter-electrode, washed and dried. The electrode is then impregnated with a 15% solution of polytetrafluoroethylene. Then the electrode is dried at 120° F, rinsed with isopropyl alcohol, followed by water rinses, and dried. The electrode is then vacuum impregnated with 0.025 molar ionic silver, scrubbed, washed and dried.

As indicated earlier, the sensing electrode of this invention achieves substantially improved performance in terms of signal voltage versus oxygen pressure. For the purpose of illustrating this performance signal voltage is that developed across a resistor 30 shown in FIG. 1 connected between the sensing electrode terminal 32 and the negative electrode terminal 20, the resistor 30 providing a load resistance between these terminals. The improved performance is illustrated in the curves shown in FIGS. 3–8.

Figure 3:
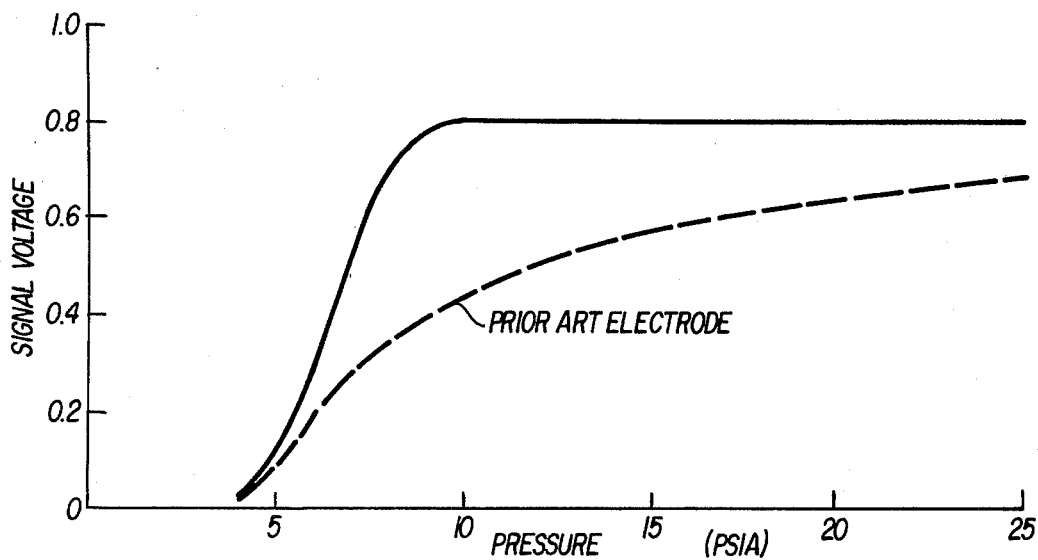
FIGS. 3, 4 and 5 are curves showing signal voltage versus oxygen pressure for the sensing electrode of this invention and a prior art sensing electrode at 100°, 32° and 75° F, respectively.
Figure 4:
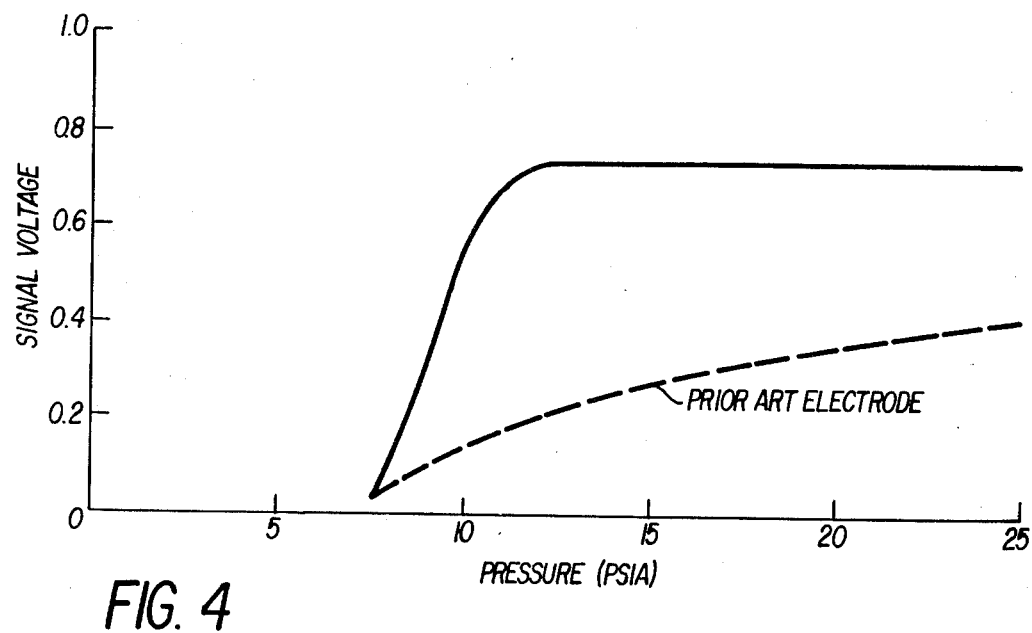
Figure 5:
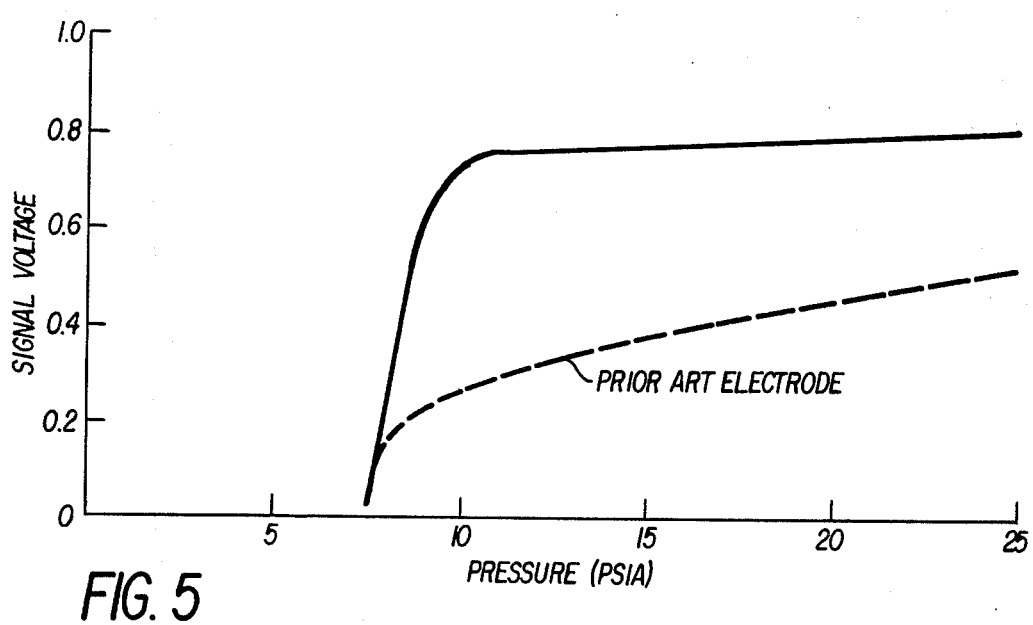

Referring to FIGS. 3–5, there is shown a comparison of the signal voltage versus oxygen pressure under three temperature conditions for the sensing electrode of this invention and a prior art sensing electrode constructed in accordance with U.S. Pat. No. 3,554,804, Carson, Jr. In these figures the solid line shows the results with the sensing electrode of this invention and the dashed line shows the results with the prior art sensing electrode. FIG. 3 represents tests made at 100° F., FIG. 4 at 32° F. and FIG. 5 at 75° F., or room temperature. Referring to FIG. 3, it can be seen that throughout the range of oxygen pressure encountered the signal voltage developed between the sensing electrode and the negative terminal of the cell across the resistor 30 is significantly greater for the sensing electrode of this invention than for the prior art electrode under similar test conditions. Moreover, the significantly greater voltage was developed despite the fact that a resistor having a resistance of 170 ohms was utilized as the load resistance with the sensing electrode of this invention whereas a much larger resistor, namely, one having a resistance of 1,050 ohms, was employed with the prior art electrode in order to obtain easily measurable readings with the latter. Had the smaller resistor been employed in testing the prior art electrode, the signal voltage would have been significantly smaller, and the difference between two curves would have been even more pronounced than that shown in FIG. 3.

The increase in signal voltage for the same oxygen pressure is even more pronounced at the lower temperature 32° F. shown in FIG. 4. As in the case of tests shown in FIG. 3, the external resistance with the prior art electrode was again 1,050 ohms whereas that employed with the electrode of the present invention was 170 ohms. The substantial difference in signal voltage, even with the lower external resistance employed with the sensing electrode of the present invention, is evident from FIG. 4.

FIG. 5 shows a comparison of performance of the sensing electrode of the present invention and the prior art electrode at 75° F., corresponding to room temperature, the external resistances being the same as in the tests of FIGS. 3 and 4. Again, the results show that a substantially greater signal voltage is obtained with the sensing electrode of this invention across the substantially entire range of oxygen pressure.

Figure 6:
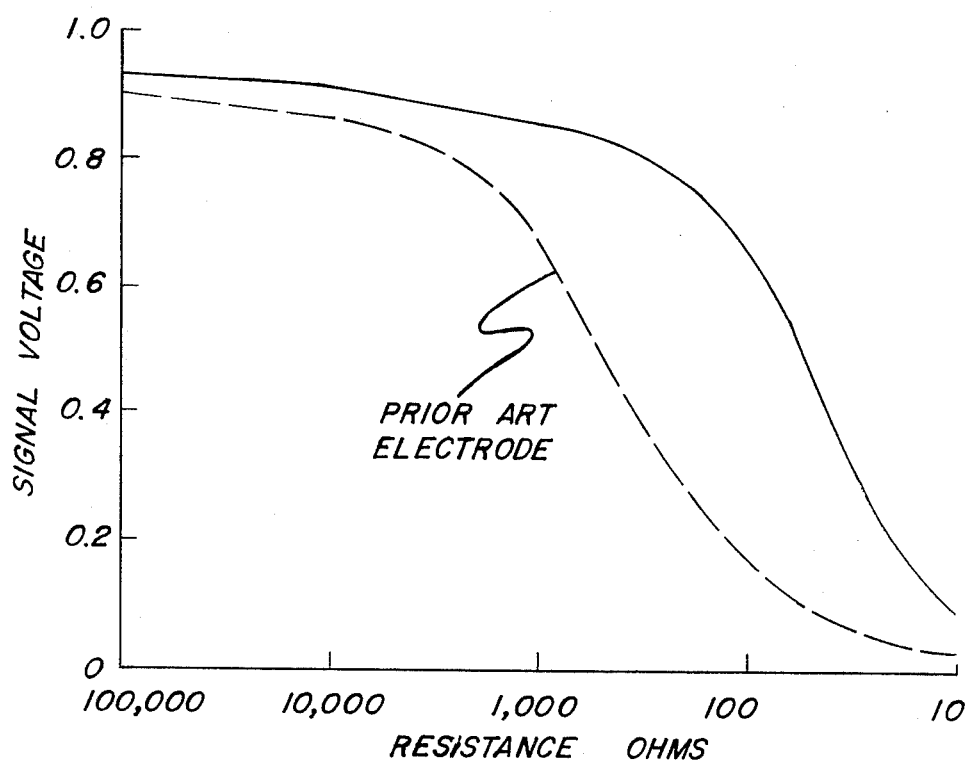
FIGS. 6, 7 and 8 are curves showing signal voltage versus load resistance for these sensing electrodes at these temperatures at constant pressure.
Figure 7:
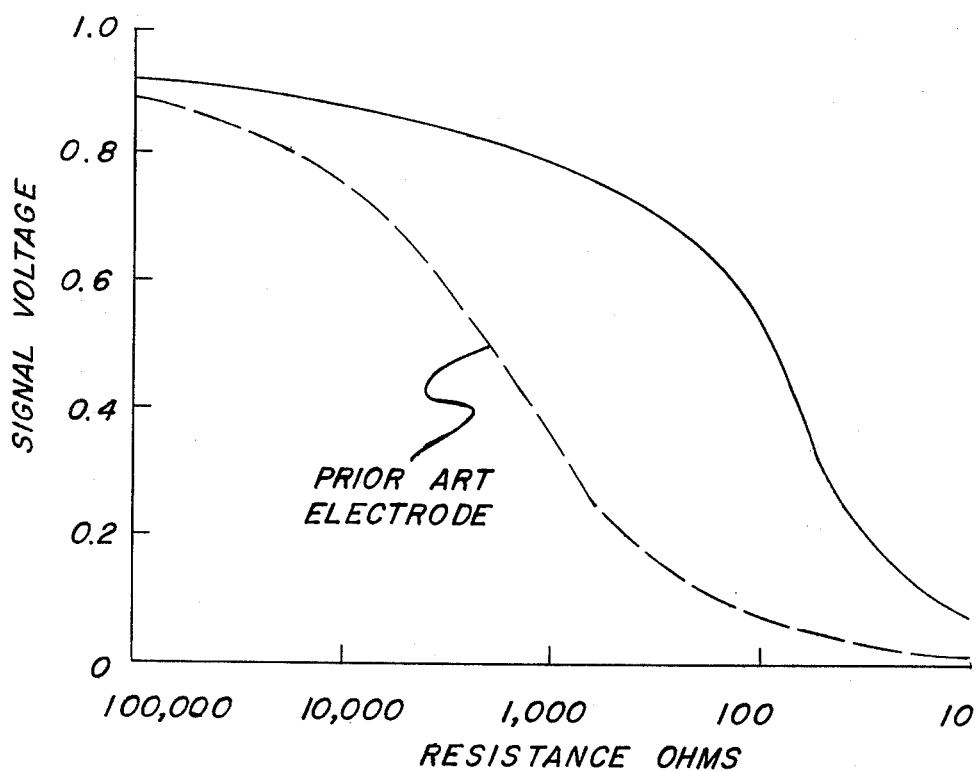
Figure 8:
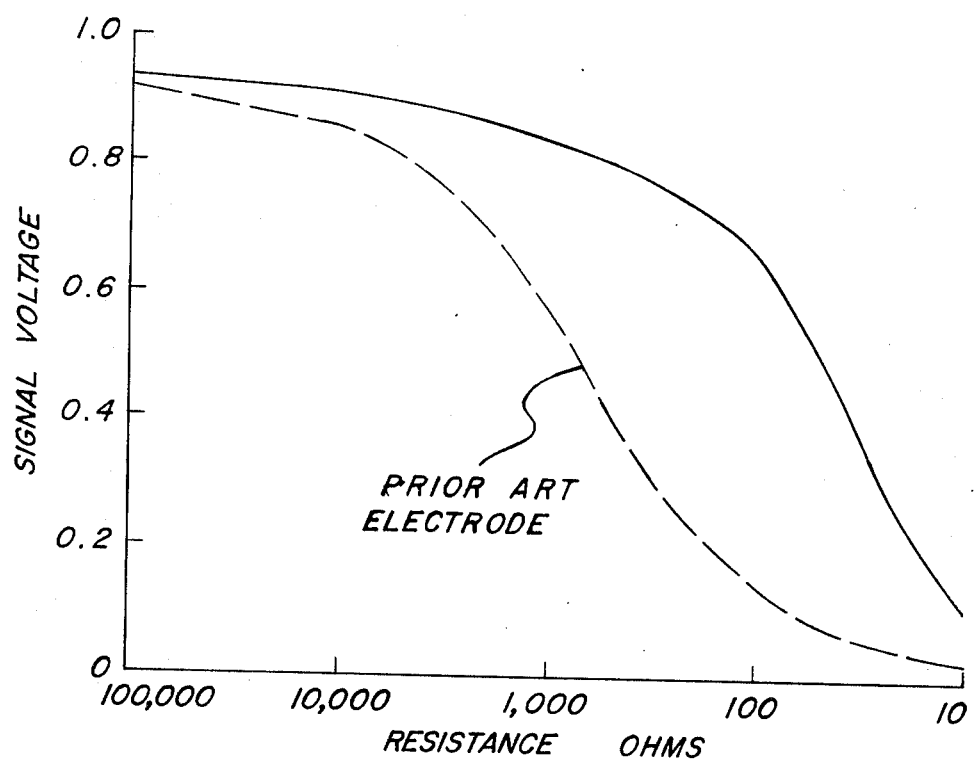

To give a more complete picture of the comparative results with the sensing electrode of the present invention and the prior art sensing electrode, reference may be made to the curves shown in FIGS. 6, 7 and 8. These curves represent, like the curves of FIGS. 3, 4 and 5, respectively, the test results at temperatures of 100°, 32°, and 75° F., respectively. The tests were made with an oxygen pressure of 15 PSIA. The curves in FIGS. 6, 7 and 8 show the signal voltage developed across the load resistor 30 for various values of the load resistance ranging from 10 ohms to 100,000 ohms. These results were achieved with a constant oxygen pressure of 15 PSIA in the cell employing the sensing electrode of this invention and the cell employing the prior art sensing electrode. It can be seen from FIGS. 6, 7 and 8 that for all useful values of the load resistance the signal voltage obtained with the sensing electrode of this invention is greater than that obtained using the prior art sensing electrode. The difference is particularly pronounced in the resistance range between 50 ohms and 1,000 ohms where maximum current, and hence power, can be transferred.

It can be seen, therefore, that by constructing the sensing electrode in accordance with this invention a significantly greater signal voltage is achieved across a lower load resistance for the same oxygen pressure under a wide range of temperature conditions. Moreover, this improved performance of the sensing electrode is achieved without incurring migration of silver oxide through the cell which migration would have deleterious effect on the overall performance of the cell and would result in reduced signal voltage because of loss of catalyst from the electrode. Finally, the oxygen sensing electrode is permeable both to oxygen and to ionic current, thereby permitting the sensing electrode to be placed between positive and negative electrodes without adverse effect on the performance of the cell.

The sensing electrode of this invention has a particular application in cells used in heartpacers. Heartpacers are implanted in the human body and it is, therefore, particularly important that oxygen pressure developing during charging of the cell be accurately and promptly sensed so that charging can be discontinued before any excessive oxygen pressure develops.

While a particular construction of the sensing electrode of this invention has been shown and described, it is not intended that the invention be limited to the specific form shown and described but rather it is intended by the appended claims to cover all modifications which come within the spirit and scope of this invention.

What is claimed as new and desired to be secured by Letters Patent of the United States is:

1. A rechargeable cell comprising:
    a. a sealed casing;
    b. a positive electrode within said casing;
    c. a negative electrode within said casing and spaced from said positive electrode;
    d. an alkaline aqueous electrolyte within said casing;
    e. an oxygen sensing electrode within said casing; and
    f. separators between adjacent electrodes;
    g. said sensing electrode comprising a substrate having cadmium thereon, and silver dispersed in intimate contact with said cadmium.

2. The cell of claim 1, wherein
    a. said sensing electrode is positioned between said positive electrode and said negative electrode; and
    b. one of said separators separates said sensing electrode from said positive electrode and said negative electrode.

3. The cell of claim 1, wherein said substrate includes nickel.

4. The cell of claim 1, wherein said sensing electrode further includes a hydrophobic fluorocarbon polymer.

5. The cell of claim 1, wherein said cadmium is in an amount approximately 20% of that employed on the negative electrode.

6. The cell of claim 1, wherein said alkaline aqueous electrolyte is potassium hydroxide.

7. The cell of claim 1, wherein a plurality of said positive electrodes and said negative electrodes are employed in alternating arrangement in said casing.

8. The cell of claim 4, wherein said hydrophobic fluorocarbon polymer comprises polytetrafluoroethylene.

9. The cell of claim 8, wherein said polytetrafluoroethylene is dispersed within said cadmium.

10. The cell of claim 7, wherein said sensing electrode is positioned between one of said positive electrodes and one of said negative electrodes.

11. A rechargeable cell comprising:
    a. a sealed casing;
    b. a plurality of positive electrodes and a plurality of negative electrodes within said casing, said positive and negative electrodes being arranged in alternating fashion from one side of the casing to another;
    c. an electrolyte of aqueous potassium hydroxide within said casing;
    d. an oxygen sensing electrode positioned between one of said positive electrodes and one of said negative electrodes;
    e. separators between adjacent electrodes;
    f. said sensing electrode comprising a substrate having cadmium thereon, said cadmium being in an amount approximately 20% of that employed on the negative electrodes;
    g. said sensing electrode further having silver dispersed in intimate contact with said cadmium and having polytetrafluoroethylene dispersed within said cadmium.

* * * * *